United States Patent [19] — Haahtela et al.

Patent Number: 4,833,977
Date of Patent: May 30, 1989

[54] PISTON FOR INTERNAL COMBUSTION ENGINE

[75] Inventors: Otso Haahtela, Braunschweig; Bern Ebel, Bremen, both of Fed. Rep. of Germany

[73] Assignee: Volkswagen AG, Wolfsburg, Fed. Rep. of Germany

[21] Appl. No.: 45,686

[22] Filed: May 1, 1987

[30] Foreign Application Priority Data

May 7, 1986 [DE] Fed. Rep. of Germany ....... 3615503

[51] Int. Cl.4 ................................................ F16J 1/04
[52] U.S. Cl. ..................................... 92/212; 92/213; 92/222; 123/193 P
[58] Field of Search ................. 92/211, 212, 213, 222, 92/224, 229, 248; 123/669, 668, 193 P

[56] References Cited

U.S. PATENT DOCUMENTS

| 2,478,179 | 8/1949 | Brockmeyer | 92/216 |
|---|---|---|---|
| 3,914,574 | 10/1975 | Hill et al. | 92/213 |
| 4,306,489 | 12/1981 | Driver et al. | 92/212 |
| 4,404,935 | 9/1983 | Kraft | 92/248 |
| 4,433,616 | 2/1984 | Hauser, Jr. | 92/190 |
| 4,495,684 | 1/1985 | Sander et al. | 92/213 |
| 4,498,219 | 2/1985 | Ban et al. | 92/213 |
| 4,506,593 | 3/1985 | Sugiyama et al. | 92/212 |
| 4,516,537 | 5/1985 | Nakahara et al. | 123/48 AA |
| 4,548,126 | 10/1985 | Donomoto et al. | 92/212 |
| 4,590,901 | 5/1986 | Mizuhara | 92/212 |
| 4,643,078 | 2/1987 | Ban | 92/213 |
| 4,677,901 | 7/1987 | Ban et al. | 92/222 |
| 4,741,253 | 5/1988 | Ogawa | 92/224 |
| 4,747,340 | 5/1988 | Schellmann et al. | 92/222 |
| 4,751,871 | 6/1988 | Burghardt et al. | 92/216 |

FOREIGN PATENT DOCUMENTS

| 670439 | 9/1963 | Canada | 92/211 |
|---|---|---|---|
| 2546388 | 4/1977 | Fed. Rep. of Germany | 123/193 P |
| 3506069 | 9/1985 | Fed. Rep. of Germany | 123/193 P |
| 913724 | 9/1946 | France | 92/213 |
| 1034364 | 6/1953 | France | 92/212 |
| 0217717 | 12/1983 | Japan | 123/193 P |
| 0173346 | 9/1985 | Japan | 123/193 P |

Primary Examiner—Edward K. Look
Assistant Examiner—Thomas Denion
Attorney, Agent, or Firm—Brumbaugh, Graves, Donohue & Raymond

[57] ABSTRACT

A piston for an internal combustion engine, in particular of a passenger automobile, the piston including a ring carrier held in a piston basic body for accommodation of piston rings associated with the piston. In order to attain favorable transmission conditions for the piston transverse forces, the ring carrier is made of a ceramic material and is designed for at least partial transmission of the transverse forces acting on the piston to the cylinder wall. The ring carrier may be held in the piston basic body by casting-in or also with the help of a locking ring securing the ring carrier axially and in the circumferential direction.

11 Claims, 1 Drawing Sheet

PISTON FOR INTERNAL COMBUSTION ENGINE

BACKGROUND OF THE INVENTION

The invention concerns a piston for internal combustion engines, in particular for passenger automobiles. The piston being of the type having a ring carrier held in a piston body so as to accommodate piston rings associated with the piston.

In the effort at constant reduction of the frictional losses and strains on the driving mechanism generated in the piston drive of internal combustion engines, attempts have been made at rendering as small as possible the piston masses and the surfaces for transmission to the surrounding cylinder walls of the transverse forces effective in the piston. However, heretofore it has not been possible to reduce the piston skirt surface as desired inasmuch as thereby operational safety was impaired. Due to the large thermal expansions in the region of the ring field as well as the lack of lubricant prevailing there, the piston lands could not be utilized for transmission of the lateral supporting forces of the piston to the cylinder wall. Rather, sufficiently large piston skirt surfaces below the piston lands had to be provided which increased the entire piston skirt length and the piston mass. Even in cases in which the piston rings are arranged in separate ring carriers held by the piston basic body, the conditions are basically the same since the known ring carriers are merely composed of special wear-resistance steel materials while the piston basic body is composed, e.g., of a light metal alloy.

SUMMARY OF THE INVENTION

Therefore, it is the purpose of the invention to create a piston for internal combustion engines, of the above type, whose force transmission to the cylinder walls and frictional conditions are improved, whereby moreover, possibilities for a reduction in the piston skirt length are offered.

This purpose is attained by the ring carrier being composed of a ceramic material and designed so as to transmit the transverse forces acting on the piston to the cylinder wall. As a result of employment of ceramic materials for the ring carrier, there is created, due to the thermal insulation action inherent in these materials as also their substantially lower thermal expansion in comparison to metallic materials, the possibility of making use, at least in part, of the ring carrier proper for supporting the piston transverse forces on the cylinder wall. Contrary to conventional embodiments, the outer diameter of the ring carrier is designed in such a fashion, at least in the regions in which the transverse forces effective on the piston can be transmitted, that the forces apply themselves directly against the cylinder wall. In comparison to conventional piston constructions at which it is only the piston skirt surfaces provided below the ring field which are employed for transmission of the piston transverse forces, whereby also, due to the distance of said surfaces from the plane of the piston pins considerable torques may be generated at times, the force transmission conditions are considerably improved in the present case. Moreover, the favorable friction and wear qualities of ceramic materials result in the decreased wear and tear of the ring land region as also a reduction in frictional losses.

BRIEF DESCRIPTION OF THE DRAWING

The drawing shows two embodiments of the invention in the form of schematic representations.

DETAILED DESCRIPTION OF THE PREFERRED EMBODIMENT

Figure 1:
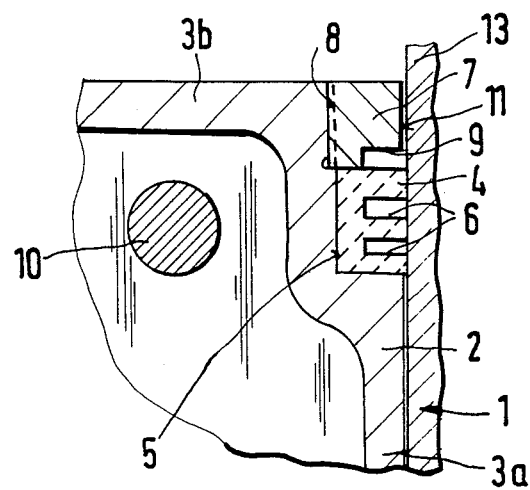
FIG. 1 shows a longitudinal section through a piston according to the invention.

In the drawing, equal or comparable components are designated by identical references, possibly provided with a prime mark. -1- represents the piston as a whole. The piston is provided, e.g. for a high-speed internal combustion engine of a passenger automobile. The piston has a piston basic body -2- composed, e.g., of a light metal alloy, with a piston skirt region -3a- and a piston head -3b-. In an annular cavity -5- extending over at least a part of the circumference of the piston basic body -2- is held a ring carrier -4- which is provided with annular grooves -6- accommodating the customary piston rings, not shown here. The ring carrier is to be composed of a ceramic material which, in comparison to the light-metal piston basic body -2-, displays more favorable frictional and wear properties with respect to the metallic material of the cylinder wall. The outer diameter and, respectively, the outer contour of the ring carrier -4- is defined in such a manner that at least in the peripheral region approximately perpendicular to the axis of the piston pin designated by -10-, the ring carrier applies itself against the surrounding cylinder wall -13- and therefore participates there in the transmission to the cylinder wall of transverse forces exerted by the piston pin -10- on the piston -1- during operation of the internal combustion engine. The ceramic ring carrier -4- may be held in the metallic piston basic body -2- by means of casting-in or also, such as indicated schematically in the drawing, by a locking ring -7- firmly holding the ring carrier. The locking ring -7- composed of a metallic material and having an outer contour -11- which, with respect to the surrounding cylinder wall -13-, forms a top land, may, in turn, be fixed to the piston basic body -2- in different manners. In the drawing is indicated a screw connection -8- between the locking ring -7- and the piston basic body -2-. However, in place of such a connection may also be provided a shrinkage fit, cementing or welding or the like. In any case, the locking ring, which may also be provided with an annular groove -9- to accommodate an additional piston ring, is to secure the ring carrier 4 axially and also in the direction of the circumference, unless such securing is already obtained by the piston basic body -2-.

Figure 2:
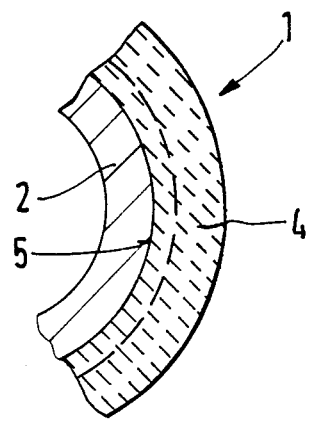
FIG. 2 is a portion of a horizontal section through the piston of FIG. 1 on the level of the ring carrier.
Figure 3:
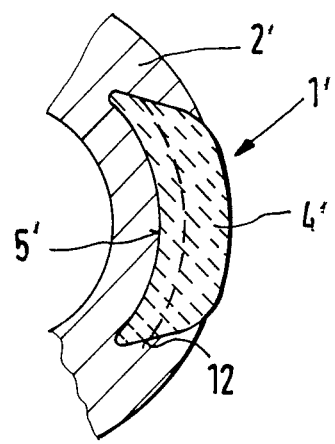
FIG. 3 is a view similar to that in FIG. 2 of an alternative embodiment of the invention.

As shown in FIG. 2, the ring carrier -4- may be rendered as a closed encircling ring or, as shown in FIG. 3, may be rendered in the shape of ring segments -4'- which are held in the piston basic body -2'- in a form-fitting fashion by means of undercuts -12-. In such a case, the ring segments -4'- are then preferably provided in such peripheral regions of the piston -1- so as to extend essentially perpendicular to the axis of the piston pin -10-, whereby the regions may extend each, e.g., over 1/6 of the piston circumference. The regions are already distinguished in conventional piston designs by the fact that it is in them that the piston transverse forces are transmitted. The ring carrier -4- rendered as a closed ring as shown in FIG. 2 would likewise be provided at least in these regions with an outer contour applying itself against the cylinder wall for the purpose of transmission of transverse forces. Accordingly, the ring carrier -4- could have an outer oval contour similar to that of the piston skirts of the current conventional pistons.

The axial fixing of the segment-shaped ring carrier -4'- shown in FIG. 3 may be effected in the same manner as that of a closed ring, e.g., by casting-in or application of a special locking ring -7-, such as shown, e.g., in FIG. 1.

As indicated above, a suitable selection of the ring carrier -4- material would result in that the thermal expansion of the piston region concerned would remain small. Moreover, even in the absence of oil lubrication, a good sliding behavior with little wear and tear could then be attained. This makes it possible to utilize the ring carrier proper for transmission of the piston transverse forces to the cylinder wall, as a result of which can be reduced the piston skirt length and thereby the piston mass. At the same time the force transmission conditions can be improved in that the transverse forces can be transmitted, at least in part, on a substantially higher level relative to the piston pin plane, so that the previously occurring overturning moments can be at least reduced.

While the invention has been illustrated and described as embodied in a piston for internal combustion engines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitute essential characteristics of the generic or specific aspects of this invention.

What is claimed as new and desired to be protected by letters patent is set forth in the appended claims.

We claim:

1. A piston for internal combustion engines, comprising a ring carrier held in a piston basic body and destined to accommodate piston rings associated with the piston, the ring carrier being composed of a ceramic material and extending outwardly beyond the periphery of the piston basic body so as to transmit at least part of any transverse forces acting on the piston to a cylinder wall.

2. A piston as defined in claim 1, wherein the ring carrier is held in the piston basic body by casting-in.

3. A piston as defined in claim 1, wherein the ring carrier is set into a cavity provided in the piston basic body and is held by a locking ring which is fixable on the piston basic body.

4. A piston as defined in claim 3, wherein the locking ring has a peripheral surface which forms a top land with respect to the surrounding cylinder wall.

5. A piston as defined in claim 3, wherein the locking ring is fixed on the piston basic body by means of a screw connection.

6. A piston as defined in claim 3, wherein the locking ring is held on the piston basic body by means of shrinkage fit.

7. A piston as defined in claim 3, wherein the locking ring is held on the piston basic body by one of cementing and welding.

8. A piston as defined in claim 1, wherein the ring carrier is rendered as a closed encircling ring.

9. A piston as defined in claim 1, wherein the ring carrier is rendered as ring segments provided only over a part of the piston circumference and held in a form-fitting manner in the piston basic body.

10. A piston as defined in claim 9, wherein the ring segments are provided essentially in the circumferential region of the piston so as to extend approximately perpendicular to the axis of the piston pin.

11. A piston for internal combustion engines having at least one piston cylinder with a wall, comprising: a piston basic body; piston rings; and a ceramic ring carrier held in said piston basic body and formed so as to accommodate said piston rings, said ring carrier extending outwardly beyond the periphery of the piston basic body so as to transmit to the cylinder wall at least part of any transverse forces acting on the piston.

* * * * *